United States Patent
Hagedorn et al.

(10) Patent No.: US 10,994,526 B2
(45) Date of Patent: May 4, 2021

(54) POWDER BED-BASED LASER MELTING SYSTEM

(71) Applicant: Aconity GmbH, Herzogenrath (DE)

(72) Inventors: Yves Hagedorn, Aachen (DE); Andreas Görres, Aachen (DE)

(73) Assignee: Aconity GmbH, Herzogenrath (DE)

( * ) Notice: Subject to any disclaimer, the term of this patent is extended or adjusted under 35 U.S.C. 154(b) by 473 days.

(21) Appl. No.: 15/737,954

(22) PCT Filed: Jun. 15, 2016

(86) PCT No.: PCT/EP2016/063767
§ 371 (c)(1),
(2) Date: Dec. 19, 2017

(87) PCT Pub. No.: WO2016/202866
PCT Pub. Date: Dec. 22, 2016

(65) Prior Publication Data
US 2018/0194126 A1 Jul. 12, 2018

(30) Foreign Application Priority Data

Jun. 19, 2015 (DE) .......................... 102015109848.2

(51) Int. Cl.
*B33Y 30/00* (2015.01)
*B22F 3/105* (2006.01)
(Continued)

(52) U.S. Cl.
CPC ............ *B33Y 30/00* (2014.12); *B22F 3/1055* (2013.01); *B29C 64/153* (2017.08);
(Continued)

(58) Field of Classification Search
CPC .................................................. B29C 64/135
(Continued)

(56) References Cited

U.S. PATENT DOCUMENTS 5,252,264 A * 10/1993 Forderhase ............. B22F 3/004
264/497
6,764,636 B1 * 7/2004 Allanic .................. B33Y 40/00
264/401
(Continued)

FOREIGN PATENT DOCUMENTS

DE 19649865 C1 2/1998
DE 19952998 A1 5/2001
(Continued)

OTHER PUBLICATIONS

International Search Report and Written Opinion of the International Searching Authority from corresponding Patent Cooperation Treaty (PCT) Application No. PCT/EP2016/063767, indicated completed on Sep. 13, 2016.
(Continued)

*Primary Examiner* — Matthew J Daniels
*Assistant Examiner* — Hana C Page
(74) *Attorney, Agent, or Firm* — Gardner, Linn, Burkhart & Ondersma LLP

(57) ABSTRACT

A powder bed-based laser melting ("PBLM") system comprising a process chamber having a chamber floor forming a working plane, and a powder application unit arranged in a working position in the process chamber and above the chamber floor during ongoing operation. The powder application unit is movably attached to a support structure such that the powder application unit can be moved at least partially between the working position and a rest position. The chamber floor is easily accessible with at least one component of the powder application unit arranged immovably in the working position during operation. In a particular embodiment a rail-shaped linear drive and/or a guide of the powder application unit configured as guide rails is positioned further away from the chamber floor in the rest position, and/or between the rest position and the working
(Continued)

position, than in the working position in the ongoing operation of the PBLM system.

14 Claims, 7 Drawing Sheets

(51) Int. Cl.
  *B29C 64/153* (2017.01)
  *B29C 64/205* (2017.01)
  *B29C 64/227* (2017.01)
(52) U.S. Cl.
  CPC .......... *B29C 64/205* (2017.08); *B29C 64/227* (2017.08); *B22F 2003/1056* (2013.01); *Y02P 10/25* (2015.11)
(58) Field of Classification Search
  USPC ........................................................ 264/401
  See application file for complete search history.

(56) References Cited

U.S. PATENT DOCUMENTS

| 7,931,462 B2 * | 4/2011 | Mattes | B29C 64/153 |
| | | | 425/375 |
| D835,162 S * | 12/2018 | Reches | B22F 3/004 |
| | | | D15/122 |

FOREIGN PATENT DOCUMENTS

| DE | 10342883 A1 | 5/2005 | |
| DE | 112004000301 T5 | 1/2006 | |
| DE | 202009010489 U1 | 10/2009 | |
| DE | 202012007238 U1 | 8/2012 | |
| EP | 2399695 A1 | 12/2011 | |
| EP | 2732889 A2 * | 5/2014 | ............ B22F 3/1055 |
| EP | 2732889 A2 | 5/2014 | |
| GB | 2315699 A * | 2/1998 | ............ B29C 41/36 |
| WO | WO-2019031979 A1 * | 2/2019 | ........... B29C 64/227 |

OTHER PUBLICATIONS

International Preliminary Examination Report from corresponding Patent Cooperation Treaty (PCT) Application No. PCT/EP2016/063767, dated Oct. 13, 2017.
Preliminary Report on Patentability of the International Searching Authority in English from corresponding Patent Cooperation Treaty (PCT) Application No. PCT/EP2016/063767, completed Dec. 12, 2017.

* cited by examiner

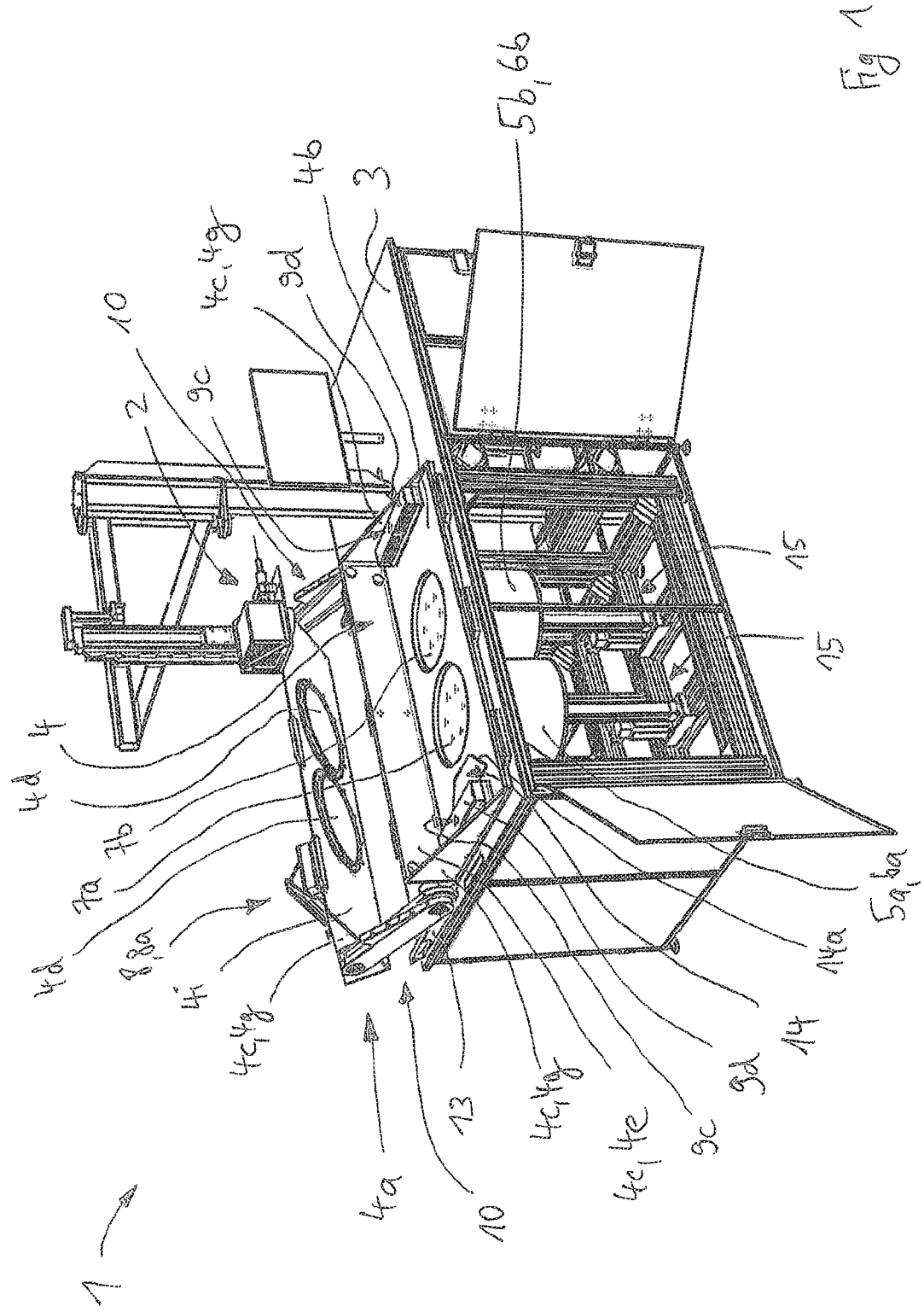

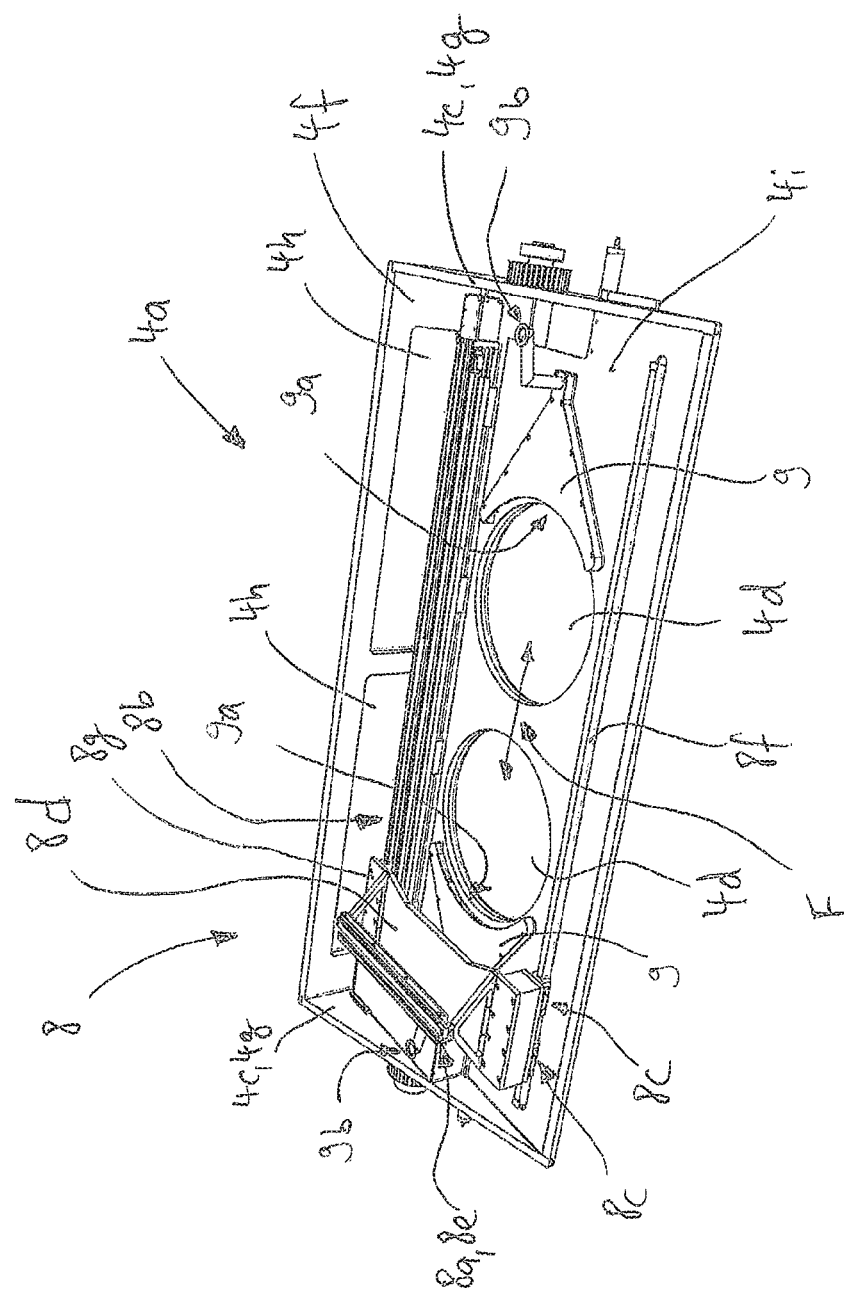

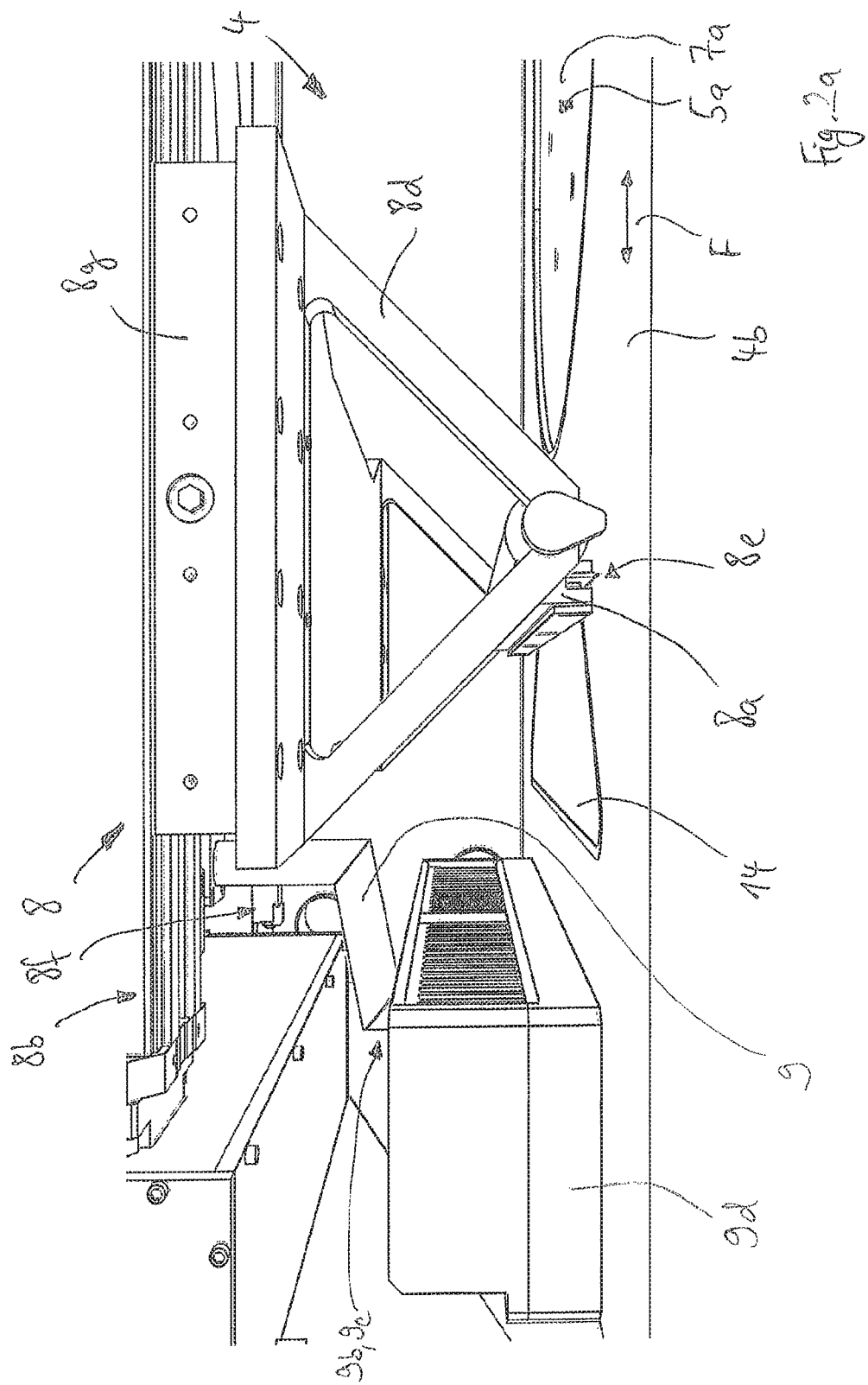

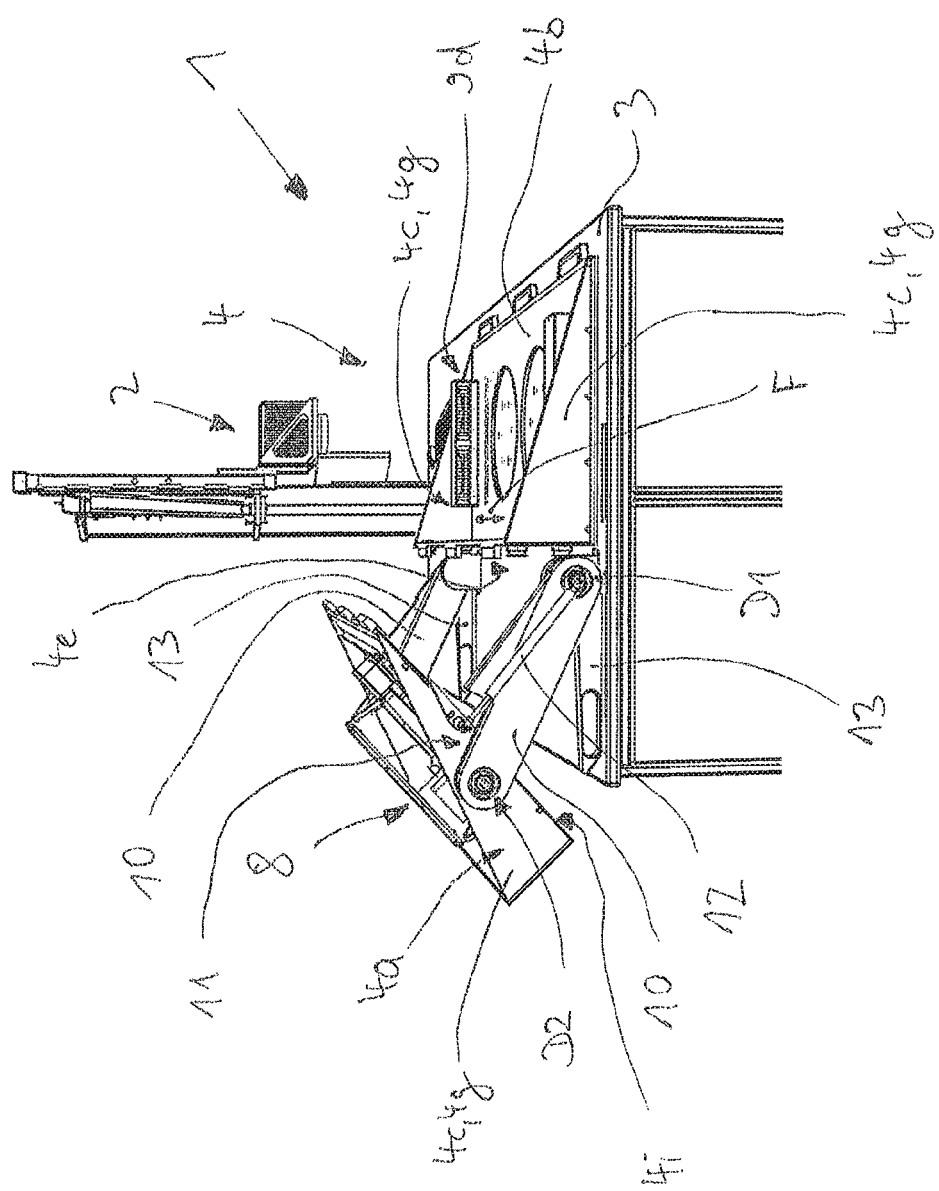

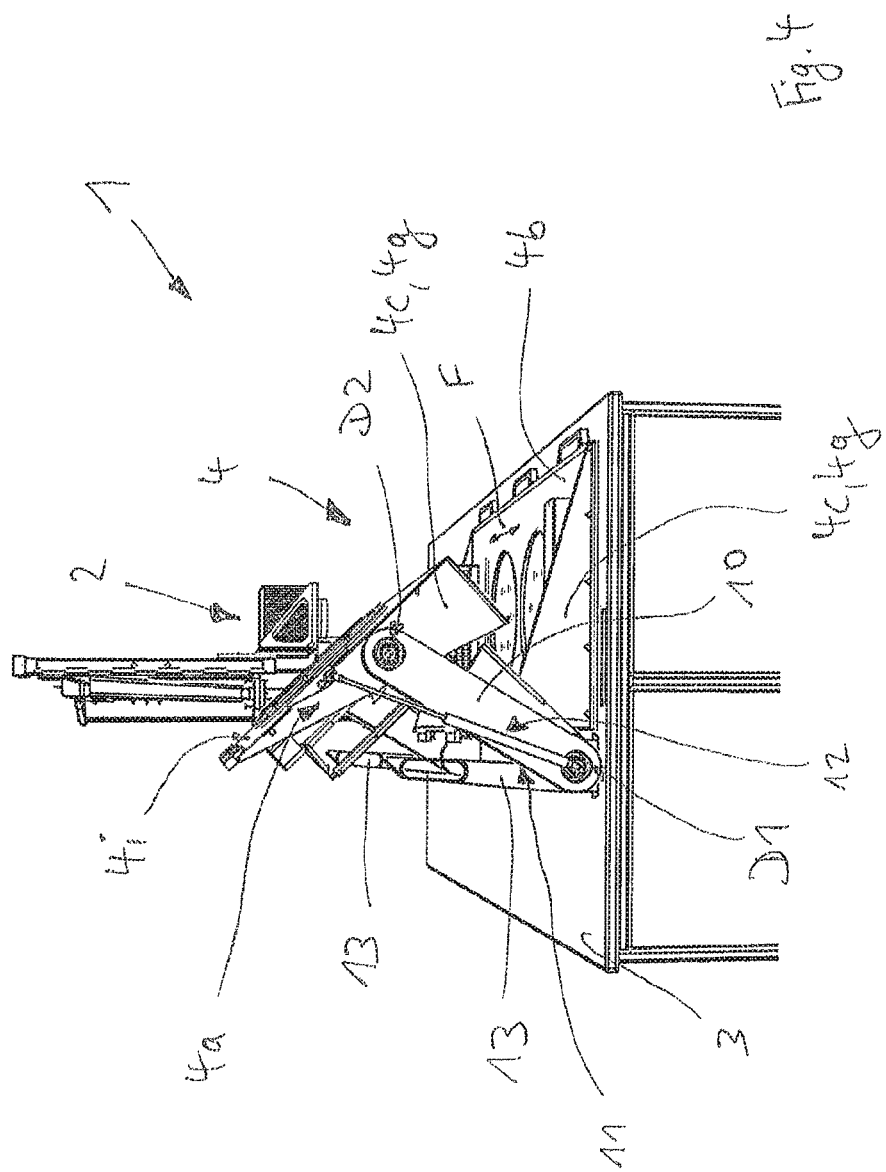

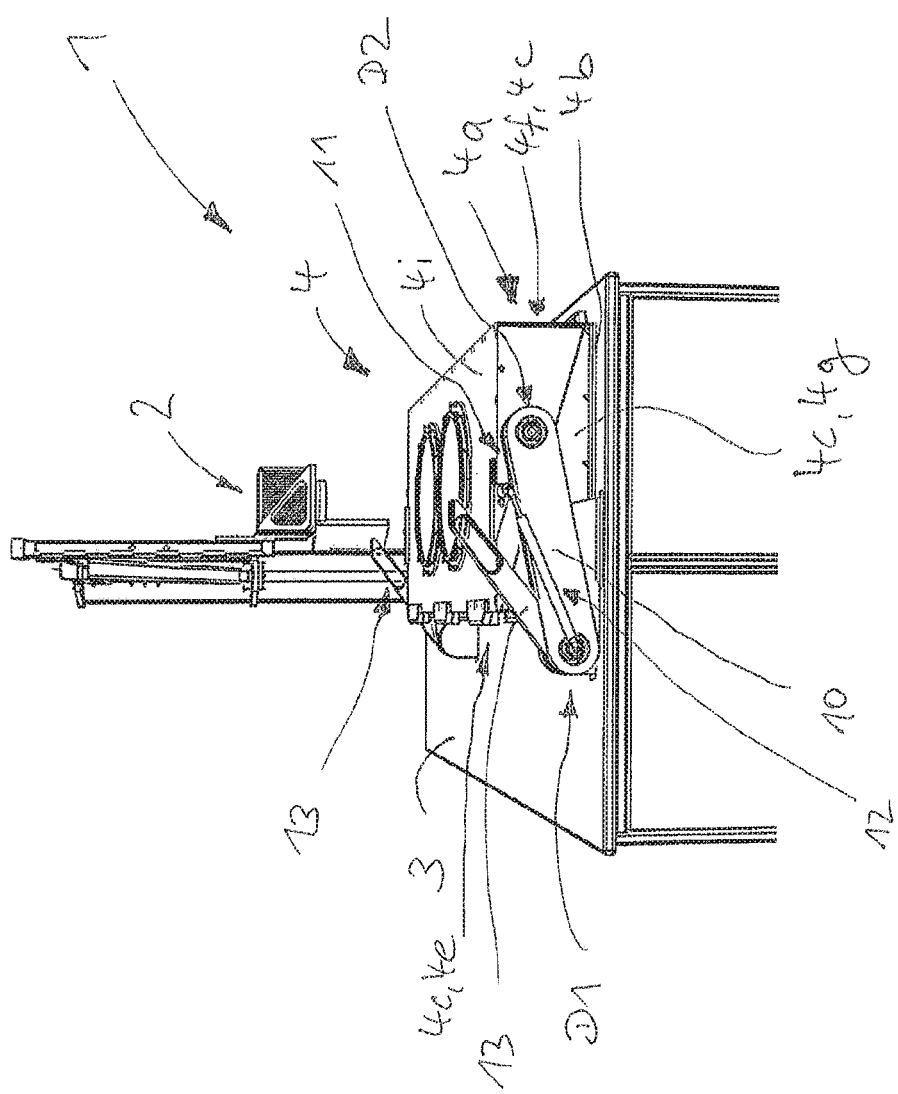

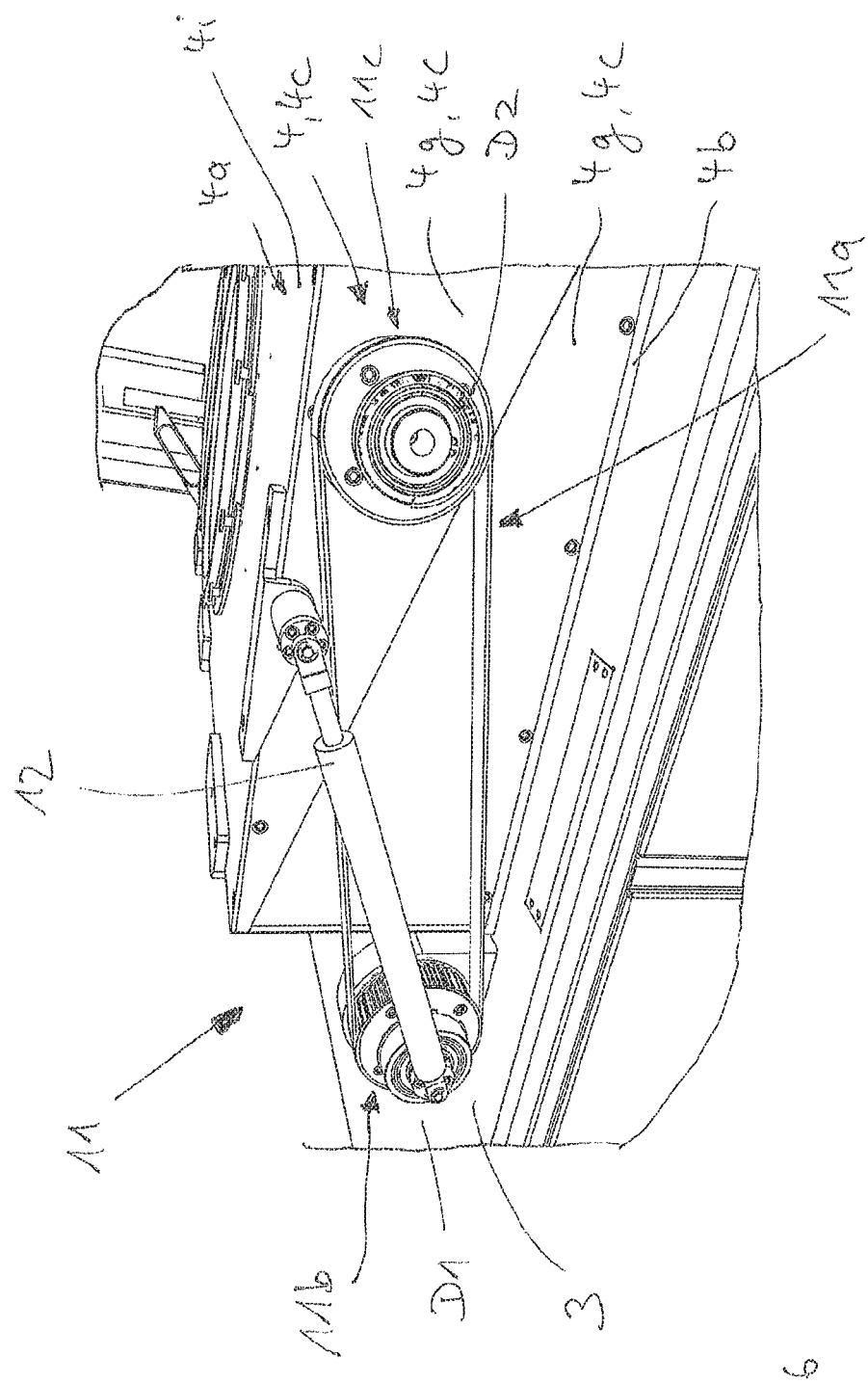

POWDER BED-BASED LASER MELTING SYSTEM

CROSS REFERENCE TO RELATED APPLICATIONS

The present application claims the priority benefits of International Patent Application No. PCT/EP2016/063767, filed Jun. 15, 2016, and claims benefit of German Application DE 10 2015 109 848.2 filed Jun. 19, 2015 which are incorporated herein by reference.

BACKGROUND OF INVENTION

The invention relates to a PBLM system having a process chamber which has a chamber floor which forms a working plane of the PBLM system, and comprising a powder application unit having an application medium movable in parallel with the working plane, wherein the powder application unit is movably attached to a support structure of the PBLM system such that the powder application unit can be moved at least partially between a working position, in which during ongoing operation of the PBLM system the powder application unit is arranged in the process chamber and above the chamber floor and wherein at least one component of the powder application unit is arranged in a positionally fixed manner, and a non-operative position.

Powder bed-based laser melting (PBLM), for which the term of selective laser fusion is also used, belongs to the group of generative manufacturing methods which are also referred to as additive manufacturing (AM) methods. PBLM is known e.g. from the German patent document DE 196 49 865 C1.

As a powder bed-based method, PBLM is to be distinguished in particular from selective laser sintering and from laser deposition welding. In the case of PBLM, components are produced in layers from a material which initially is in powder form, in particular in the form of synthetic materials or metals which—unlike in the case of laser deposition welding—is provided in layers as a resting powder bed and—unlike in the case of selective laser sintering—is completely melted and solidifies without the addition of binding agents.

In the case of the PBLM method which can be performed on a corresponding PBLM system, a movable application medium which can be designed e.g. as a brush can be used to apply a first thin powder layer of the material to be processed at a uniform layer thickness of typically 10 to 100 µm onto a substrate plate which is also defined as a base plate. The application medium is typically attached to a slide which is correspondingly movably mounted for moving the application medium as required. The substrate plate is supported by a support plate and is releasably attached, e.g. screwed, thereto. In this case, the support plate and thus also the substrate plate are arranged initially in a starting position in which the substrate plate with its surface is located below a horizontally extending working plane by the amount of the desired layer thickness. Typically, the support plate forms the movable floor of a reservoir (component reservoir) which, together with an upper opening opposite the floor, adjoins the working plane below the working plane. In this case, the floor is fitted in the manner of a piston inside the side wall of the reservoir extending at a right angle to the floor and is movable in order to be able to be lowered together with the substrate plate in steps in relation to the working plane. The application medium is movable above and in parallel with the working plane via the slide in order to push or apply the powder, starting from the working plane, onto the support plate or the substrate plate arranged thereon. When travelling over the reservoir, the application medium completely spans the opening of the reservoir in order to be able to generate, between the support plate and the working plane, a uniform powder layer with a surface which is as flat as possible.

Subsequently, the powder of the applied layer is selectively or locally completely melted by means of a laser beam, i.e. only in regions selected according to a 3D CAD model of the component to be manufactured. For this purpose, the 3D CAD model is divided by software into individual layers (slicing), from which strips are determined in the manner of contour lines of the component as selected regions, along which the laser beam is guided for selectively or locally melting the respective powder layer. The complete melting and subsequent solidification of the respective powder layer causes the material to be compacted in layers to form the component to be manufactured.

Starting from the starting position, the support plate, which accordingly serves as a construction platform, or the floor of the reservoir, after corresponding scanning of the selected regions of first powder layer, is lowered by the amount of a further desired layer thickness and a further powder layer is applied to the respectively previous layer, is melted and hereby compacted and joined to the previous layer. In this case, at least one of the previous layers is melted again at least partially in order to ensure an integrally joined connection to the following layer. This cycle is repeated with a plurality of powder layers until the component is completed. By means of the selective melting of selected regions in each powder layer, a powder bed which consists of non-fused powder of all applied layers and surrounds the component is also built up in the reservoir between the support plate and the working plane. In order to remove the component from the powder bed, the floor of the reservoir formed by the support plate is raised in the direction of the working plane and thus in the direction of an upper opening of the reservoir opposite the floor and the substrate plate, to which the component is integrally joined via the first layer, is released from the support plate and removed from the PBLM system. The component is subsequently separated, e.g. sawn off, from the substrate plate. In this manner, PBLM can be used to produce three-dimensional components in a mouldless manner, i.e. without tools or moulds, and almost without restrictions in relation to the geometric component complexity.

In order to provide the application medium of a PBLM system with the powder on the working plane, powder conveying mechanisms according to the bottom-up principle and according to the top-down principle are essentially known and are used to convey the powder to the working plane. In the case of a bottom-up mechanism, the powder is conveyed from below the working plane upwards onto the working plane and in the case of a top-down mechanism the powder is conveyed from above the working plane downwards onto the working plane.

For example, PBLM systems are known which have a bottom-up mechanism which comprises a reservoir (powder reservoir) which is designed similarly to the above-described reservoir for the component. Accordingly, this reservoir likewise comprises a floor which is movable in the manner of a piston. An upper opening in the reservoir opposite the floor is arranged in the working plane, from where the reservoir adjoins the working plane below the working plane. The powder stored in the reservoir of the bottom-up powder conveying mechanism is moved by raising the support plate, which forms the floor, inside the reservoir and, in association therewith, reducing the available volume of the reservoir in the direction of the upper opening or through the upper opening of the reservoir at that location and is thus conveyed to the working plane where it is provided to the application medium. By inversely lowering the floor, the available volume of the reservoir is increased in order to be able to receive and store a corresponding quantity of powder therein.

Unlike in the case of top-down mechanisms, the powder in a bottom-up mechanism does not fall in a gravity-driven manner into the region of the working plane. As a result, dust formation resulting in optical and movable components of the PBLM system becoming undesirably contaminated is minimised and as a result good process quality and stability are ensured. Furthermore, bottom-up mechanisms comprising a reservoir with a floor which can be moved like a piston can be cleaned particularly easily if the powder has to be replaced as far as possible without residue e.g. for a change of material. This is associated with greater outlay in the case of other bottom-up mechanisms which convey the powder to the working plane e.g. by means of a screw conveyor.

Moreover, it is known to provide a PBLM system not only with the component reservoir but also with a so-called powder overflow, into which excess powder still located upstream of the slide can be pushed, after the slide has travelled over the component reservoir for the purpose of building-up a new powder layer. For this purpose, the working plane has, in addition to the component reservoir, an aperture which is formed by the opening of a collecting reservoir which forms the powder overflow and adjoins the aperture via the opening below the working plane and into which the excess powder can fall. Such a powder overflow means that the process chamber can be kept as free as possible of excess powder to ensure good process stability.

In order to prevent oxidation-induced contamination of the material during the melting process, PBLM is performed in a protective gas atmosphere. As a result, relative component densities of more than 99% can be achieved by means PBLM. In contrast, the relative density of the powder which is referred to as bulk density is about 50% and thus about half the relative density of the component produced. The relative density thus serves as a measurement of the porosity of the material in its respective current form, i.e. as a finished component or as a powder, in relation to the corresponding material in a pore-free form. Also, the components manufactured by PBLM have mechanical properties which largely correspond to those of the base material or to those of the components which are produced from the base material by means of conventional methods.

For this purpose, PBLM systems have a gas-tight process chamber in which a corresponding protective gas atmosphere, in particular an inert gas atmosphere including argon or nitrogen, is maintained. Typically, at least the working plane and the application medium are arranged directly inside the process chamber. A protective gas atmosphere also prevails in the component reservoir comprising the construction platform and the substrate plate, the powder reservoir of the bottom-up powder conveying mechanism and the powder overflow so that they are connected accordingly in a gas-tight manner to the process chamber for this purpose.

In the case of known PBLM systems, the powder application unit is arranged in the process chamber in a fixed working position above a chamber floor of the process chamber, whereby the process chamber and in particular the chamber floor in the region of the powder application unit is not accessible or can only be accessed with difficulty and therefore is complex to clean e.g. for a change of material.

DE 199 52 998 A1 discloses a PBLM system, whose powder application unit comprises a doctor blade which is arranged on a cover in the process chamber and can be moved in a horizontal direction in order to apply a powder layer on a working plane. Moreover, the doctor blade can be moved, together with the cover like drawer, in a translational manner in a horizontal direction. Therefore, during ongoing operation the powder application unit remains in a working position when the cover is closed in the same way as it remains in a non-operative position when not in ongoing operation when the cover is open with all of its components and in particular including the doctor blade spaced at the same distance apart from the chamber floor within the process chamber.

DE 20 2009 010 489 U1 discloses a PBLM system, whose powder application unit, during ongoing operation, is mounted so as to be pivotable about a vertical axis in order to apply a powder layer.

U.S. Pat. No. 6,764,636 B1 relates to a stereolithography system comprising an application medium for producing a layer of viscous liquid synthetic material, in particular resin. The application medium can be moved and pivoted in a reciprocating manner in a horizontal direction.

EP 2 399 695 relates to a laser sintering device comprising a powder application device, whose powder chamber and smoothing slide can be pivoted together about a horizontal axis during the application of a powder layer during ongoing operation so that the powder layer is applied along a circular path segment. In this case, the powder application device is suspended from a fork and can be displaced therewith in a vertical direction.

EP 2 732 889 A2 relates to a laser sintering device comprising a powder application unit, whose application medium can be moved in a reciprocating manner in two opposite directions in parallel with the horizontal working plane during ongoing operation. In conjunction with its change in direction, the application medium is pivoted about a horizontal axis so that on the return path the application medium assumes a position which is pivoted with respect to the forward path. For this purpose, the application medium is pivotably mounted on a guide block which can be moved in a reciprocating manner along a positionally fixed guide in parallel with the horizontal working plane.

A cover which can be moved like a hinge between an open position and a closed position is known from DE 11 2004 000301 T5 in relation to a system for selective laser sintering.

PBLM systems whose process chamber can be closed and opened via a cover are already known from DE 20 2012 007 238 U1, DE 199 52 998 A1, DE 103 42 883 A1.

SUMMARY OF THE INVENTION

The invention provides an improved PBLM system, whose chamber floor is easily accessible and therefore is easy to clean.

This object is achieved by a PBLM system having the features of claim 1. The dependent claims describe advantageous embodiments of the invention.

In accordance with an aspect of the invention, an improved PBLM system comprising a process chamber which has a chamber floor which forms a working plane of the PBLM system, and comprising a powder application unit having an application medium movable in parallel with the working plane, wherein the powder application unit is movably attached to a support structure of the PBLM system such that the powder application unit can be moved at least partially between a working position, in which during ongoing operation of the PBLM system the powder application unit is arranged in the process chamber and above the chamber floor and wherein at least one component of the powder application unit is arranged in a positionally fixed manner, and a non-operative position, is achieved in that the at least one component of the powder application unit which during ongoing operation of the PBLM system is arranged in a positionally fixed manner in the working position, is a rail-shaped linear drive unit and/or a guide of the powder application unit designed as a guide rail, and is positioned further spaced apart in the non-operative position and/or between the non-operative position and the working position in relation to the chamber floor than in the working position during ongoing operation of the PBLM system. For this purpose, the corresponding component or components can be moved in a translational manner vertically in relation to the chamber floor and/or in a rotational manner in order to make the chamber floor accessible without obstruction for cleaning purposes.

Also, the at least one correspondingly temporarily repositioned component itself is hereby more easily accessible and thus easier to clean as a result. It is evident that the present object is achieved not only by a non-operative position in terms of an end position. Instead, this also applies to other positions which deviate from the working position and can be assumed in the direction of the non-operative position between the non-operative position and the working position because a correspondingly changed position of at least one corresponding component of the powder application unit permits improved accessibility of the chamber floor.

The accessibility of the chamber floor and the at least one component is further improved by virtue of the fact that the powder application unit in the non-operative position is arranged at least partially outside the process chamber.

Provision may be made that the powder application unit is rotatably attached such that the at least one component of the powder application unit performs a first rotational movement in relation to a first axis of rotation between the working position and the non-operative position. The rotational movement can be performed by the component, which is formed by the drive unit and/or the guide of the powder application unit designed as a guide rail, together with an application medium. Preferably, provision is made that the first axis of rotation is oriented in parallel with the chamber floor and is arranged preferably in a positionally fixed manner on the PBLM system, in particular in parallel with a side wall of the process chamber and/or in parallel or transversely to a direction of travel of a slide of the powder application unit. As a result, the powder unit can be turned so that it is rotated with its inner side at least from its position pointing vertically downwards in the working position and subsequently points preferably obliquely upwards in the non-operative position in order to be particularly easily accessible for cleaning thereof for a change of material. The accessibility of the process chamber and the chamber floor is also improved.

The turning of the powder application unit is further facilitated by virtue of the fact that the powder application unit is rotatably attached such that the powder application unit additionally performs a second rotational movement in relation to a second axis of rotation between the working position and the non-operative position, said second axis of rotation extending preferably in parallel with the first axis of rotation and preferably the first rotational movement and the second rotational movement being mutually opposed.

Provision may be made that, in order to attach the powder application unit, the PBLM system has a pivot mechanism having a pivot arm, to which the powder application unit is attached. The pivot mechanism ensures a particularly reliable and secure movement between the working position and the non-operative position.

Provision may be made that the pivot arm is mounted so as to be able to rotate about the first axis of rotation by means of a first rotary bearing.

Provision may be made that the powder application unit is mounted on the pivot arm so as to be able to rotate about the second axis of rotation by means of a second rotary bearing.

Provision may be made that the pivot mechanism comprises a traction drive, preferably a form-locking traction drive, in particular in the form of a belt drive or chain drive, which is connected to the powder application unit such that the first rotational movement is coupled to the second rotational movement preferably such that the first rotational movement and the second rotational movement are mutually opposed.

Provision may be made that the traction drive comprises a traction means which spans a first disk and a second disk, wherein the first disk is mounted in a rotationally fixed manner in relation to the first axis of rotation and the second disk is mounted so as to be rotatable about the second axis of rotation and is connected to the powder application unit for conjoint rotation therewith.

The rotational movement of the powder application unit is facilitated by virtue of the fact that the pivot mechanism comprises a force device which is designed in particular as a spring element, preferably in the form of a gas compression spring, as a hydraulic or pneumatic drive, in particular in the form of a lifting cylinder, or is designed as a linearly acting electric drive, and is arranged such that, in the working position and in the non-operative position, it acts adjacent the second rotary bearing upon the powder application unit in order to at least assist the rotational movements of the pivot mechanism. With corresponding dimensioning, the rotational movements can also be completely effected by the force device.

A particularly secure movable attachment of the powder application unit is achieved by virtue of the fact that the powder application unit, in particular a drive unit and/or a guide of the powder application unit designed preferably as a guide rail, is attached to a side wall and/or to a chamber ceiling of the process chamber, wherein the side wall and/or the chamber ceiling can be moved together with the powder application unit between a closed position corresponding to the working position and an open position corresponding to the non-operative position.

Provision may be made that the side wall and/or the chamber ceiling is part of a movable cover of the process chamber which is arranged between the powder application unit and the pivot mechanism.

The invention provides an improved PBLM system, whose process chamber which is accessible from above can be easily opened and closed via a movable cover. In accordance with an aspect of the invention, an improved PBLM system comprising a process chamber which has a cover which comprises at least a part of the chamber ceiling and is rotatably attached to a support structure of the PBLM system for opening and closing the process chamber such that the cover can be moved between an open position and a closed position and performs a first rotational movement in relation to a first axis of rotation, is achieved in that, in order to attach the cover, the PBLM system has a pivot mechanism having a pivot arm, to which the cover is attached.

The pivot mechanism ensures a particularly reliable and secure movement between the open position and the closed position. As a result, in the open position, the closed position and each position therebetween the cover is connected to the PBLM system and can easily be guided between the open position and the closed position. Preferably, provision is made that the first axis of rotation is oriented in parallel with a chamber floor of the process chamber and is arranged preferably in a positionally fixed manner on the PBLM system, in particular in parallel with a side wall of the process chamber and/or in parallel or transversely to a direction of travel of a slide of a powder application unit of the PBLM system. As a result, the cover can be turned so that it is rotated with its inner side at least from its position pointing vertically downwards in the closed position and subsequently points preferably obliquely upwards in the non-operative position in order to be particularly easily accessible for cleaning thereof for a change of material. The accessibility of the process chamber and the chamber floor is also improved.

The turning of the cover is further facilitated by virtue of the fact that the cover is rotatably attached such that the cover additionally performs a second rotational movement in relation to a second axis of rotation between the open position and the closed position, said second axis of rotation extending preferably in parallel with the first axis of rotation and preferably the first rotational movement and the second rotational movement being mutually opposed.

Provision may be made that the pivot arm is mounted so as to be able to rotate about the first axis of rotation by means of a first rotary bearing.

Furthermore, provision may be made that the cover is mounted on the pivot arm so as to be able to rotate about the second axis of rotation by means of a second rotary bearing.

Provision may be made that the pivot mechanism comprises a traction drive, preferably a form-locking traction drive, in particular in the form of a belt drive or chain drive, which is connected to the cover such that the first rotational movement is coupled to the second rotational movement preferably such that the first rotational movement and the second rotational movement are mutually opposed.

Provision may be made that the traction drive comprises a traction means which spans a first disk and a second disk, wherein the first disk is mounted in a rotationally fixed manner in relation to the first axis of rotation and the second disk is mounted so as to be rotatable about the second axis of rotation and is connected to the cover for conjoint rotation therewith.

The rotational movement of the cover is facilitated by virtue of the fact that the pivot mechanism comprises a force device which is designed in particular as a spring element, preferably in the form of a gas compression spring, as a hydraulic or pneumatic drive, in particular in the form of a lifting cylinder, or is designed as a linearly acting electric drive which is arranged such that, in the open position and in the closed position, it acts adjacent the second rotary bearing upon the cover in order to at least assist the rotational movements of the pivot mechanism. With corresponding dimensioning, the rotational movements can also be completely effected by the force device.

Moreover, provision may be made that the PBLM system comprises a powder application unit which is attached to the cover and thereby can be moved together with the cover between a working position corresponding to the closed position and a non-operative position corresponding to the open position. This reduces the cleaning complexity in the event of a change of material because the chamber floor is free of dirt-sensitive movable components of powder application unit and therefore contamination thereof by means of powder is minimised.

Provision may be made that the cover comprises a side wall of the process chamber. Therefore, by reason of the remote side wall particularly in the open position the chamber floor is accessible without barriers and in the event of a change of material powder can be removed particularly easily in the region of the side wall which is moved away the with cover.

BRIEF DESCRIPTION OF THE DRAWINGS

An exemplified embodiment of the invention will be explained in greater detail hereinafter with reference to the drawings. in which:

FIG. 1 shows a view of a PBLM system with the process chamber completely open;

FIG. 2 shows a view of an inner side of the cover of the process chamber of the PBLM system;

FIG. 2a shows a view of a powder application unit in its working position with the process chamber completely closed;

FIG. 3 shows a side view of the PBLM system shown in FIG. 1;

FIG. 4 shows a side view of the PBLM system with the process chamber partially open;

FIG. 5 shows a side view of the PBLM system with the process chamber completely closed; and FIG. 6 shows a view of a belt drive of a pivot mechanism for the cover of the process chamber.

DETAILED DESCRIPTION OF THE PREFERRED EMBODIMENT

FIG. 1 shows a view of a PBLM system 1 comprising a bottom-up powder conveying mechanism. The PBLM system 1 is designed as a so-called single scanner system and comprises accordingly only one scanner unit 2 with a laser. However, basically the PBLM system 1 is not restricted to lasers because, instead of using a laser it is also possible to use another device which can generate electromagnetic radiation suitable for selectively melting the respective material, e.g. electron beam melting (EBM). Moreover, the PBLM system 1 has a frame-like table 3 which supports a process chamber 4 formed in the manner of a housing. The process chamber 4 has a substantially box-shaped or cuboidal structure with a chamber ceiling 4i formed as a movable cover 4a, a chamber floor 4b and four side walls 4c. Accordingly, the four side walls 4c are each formed in a rectangular shape and are formed by a rear wall 4e, a front wall 4f opposite thereto (see FIG. 2) and two end walls 4g. On its underside, the process chamber 4 is connected to the table 3 via the chamber floor 4b. The cover 4a comprises at least the chamber ceiling 4i and, for the purpose of opening or closing the process chamber 4, can be moved relative to the chamber floor 4b and the table 3 between an open position illustrated in FIGS. 1 and 3 and a closed position illustrated in FIG. 5. In the closed position, the cover 4a thus serves to close the process chamber 4 in its upper region or, in the open position, said cover ensures that the process chamber 4 is accessible from above. In this sense, the cover 4a cannot be equated to a possible side door on one of the side walls 4c.

In order to be able to perform the PBLM method, the cover 4a must be in the closed position. Only then is the process chamber 4 closed in a gas-tight manner with respect to its surrounding area so that, as described in the introduction, the protective gas atmosphere which is required to perform the PBLM method can be produced and maintained in the process chamber 4 by means of a protective gas feed, not illustrated.

The PBLM system 1 can be placed on a floor via the table 3. The scanner unit 2 arranged completely, in particular including the optical components for the defined coupling-in of the laser radiation, outside the process chamber 4, can be connected to the table 3 and can be supported thereon and/or can be stood separately on the floor as indicated in FIG. 1. Moreover, the scanner unit 2 can be pivoted above the process chamber 4 and/or next to the process chamber 4 and conversely can be pivoted back over the process chamber 4 for the ongoing operation of the PBLM system 1. The laser beam of the scanner unit 2 which is correspondingly pivoted back and is thus arranged above the process chamber 4 is then coupled into the process chamber 4 via one of two coupling-in glasses 4d (see also FIG. 2) provided in the cover 4a or the chamber ceiling 4i and is guided to the selected regions in the region of the powder layer to be melted. However, the PBLM system 1 can be designed not only as a single scanner system having a scanner unit 2 but can also be designed as a multiscanner system, in particular as a two-scanner system with two scanner units 2. Accordingly, at least one further laser beam must be coupled into the process chamber via one of the coupling-in glasses 4d, wherein a plurality of laser beams can also be coupled-in through a coupling-in glass 4d.

Arranged within the process chamber 4 is a horizontally extending working plane which is formed substantially by the chamber floor 4b or the surface thereof and is defined in a rectangular shape by the side walls 4c.

Moreover, a powder application unit 8 having an application medium in the form of a brush 8e which is movable in parallel with the working plane via a bar-shaped slide 8a is arranged in the process chamber 4, i.e. in a space enclosed by the closed process chamber 4. The powder application unit 8 is attached to an inner side of the cover 4a (see also FIG. 2) and consequently, when the process chamber 4 is being opened, can be moved together with the cover 4a between the open position (see FIGS. 1 and 3) and the closed position (see FIG. 5). In this case, the powder application unit 8 is arranged in the closed position of the cover 4a and in particular during ongoing operation of the PBLM system 1 such that the slide 8a can be moved in a reciprocating manner above the working plane and in parallel therewith in a direction of travel F (see FIG. 2a) in order to effect a uniform application of powder on the construction platform and a substrate plate of the PBLM system 1 supported thereby by means of the application medium attached to the slide 8a. The closed position of the cover 4a corresponds to a working position of the powder application unit 8, wherein the powder application unit 8 is suspended from the cover 4a in the direction of the chamber floor 4b. By reason of the attachment of the powder application unit 8 to the cover 4a, no attachment to the chamber floor 4b is provided which means that the chamber floor is free of components of the powder application unit 8. The material, provided in powder form, for producing a component is provided to the application medium for this purpose by a bottom-up powder conveying mechanism, described in greater detail below, in the region of the working plane. Further details relating to the process chamber 4 and the powder application unit 8 are described in greater detail below.

Between its two ends, the working plane is not formed exclusively by the chamber floor 4b because three apertures which, as seen in the direction of travel F, are arranged next to one another and spaced apart from one another are provided in the chamber floor 4b and thus also in the working plane.

One of the two outer apertures is adjoined below the working plane by a releasably attached collecting reservoir 14 serving as a powder overflow for excess powder. The corresponding aperture is defined by an upper opening in the collecting reservoir 14 or a side wall 14a of the collecting reservoir 14, which for its formation extends at least with its inner side downwards at a right angle from the working plane, or by a correspondingly formed intermediate piece which connects the aperture to the collecting reservoir 14 or its upper opening. The collecting reservoir 14 is arranged on one of the opposite ends of the working plane, between which the slide 8a with the application medium moves when the cover 4a is in the closed position. The base surface of the collecting reservoir 14 is substantially trapezoidal. In this case, the correspondingly elongate and narrow base surface extends with its longitudinal extension transversely to the direction of travel F and thus in parallel with the longitudinal extension of the application medium and of the slide 8a.

The inner one of the three apertures is adjoined below the working plane by a first reservoir 5a and the other of the two outer apertures is adjoined by a second reservoir 5b in the sense described in the introduction. In this case, the two reservoirs 5a, 5b together with their upper openings adjoin the working plane via the respective aperture and thereby define said working plane. Both reservoirs 5a and 5b are constructed in a similar manner and comprise in this case a first or second side wall 6a or 6b whose inner side extends at a right angle to, and away from, the working plane. A first support plate 7a and a second support plate 7b located opposite the corresponding upper opening are each fitted within each side wall 6a, 6b and are arranged to be movable therein in the manner of a piston in order to form the corresponding floor of the reservoir 5a, 5b. The reservoirs 5a, 5b each have a base surface. The respective side wall 6a, 6b and the floor which is formed by the support plate 7a, 7b are formed corresponding to the base surface. In the present case, the side walls 6a, 6b are cylindrical so that the reservoirs 5a, 5b form a type of cylinder-piston unit.

The reservoirs 5a, 5b can have a round base surface, a circular base surface as illustrated in particular in FIG. 1, or even an oval base surface. However, as an alternative it is also feasible to provide reservoirs 5a, 5b having square or rectangular base surfaces or having bases surfaces which have both round and straight side edges. The side walls 6a, 6b and the support plates 7a, 7b are formed corresponding to the base surface and the support plates 7a, 7b are also fitted into the respective side walls 6a, 6b in order to perform their above-described function as a piston. In this case, the support plates 7a, 7b extend with their surface in each case corresponding to the base surface in parallel with the working plane and at a right angle to the side walls 6a, 6b. The base surfaces of the reservoirs 5a, 5b do not have to be identical as in the present exemplified embodiment and instead base surfaces which are not alike and are not the same size are also feasible. However, typically the base surface of each collecting reservoir 14 is smaller than the base surface of the first reservoir 5a operated as the component reservoir.

The support plates 7a, 7b can be lifted and lowered by means of schematically illustrated drives 15, which are designed e.g. as electromechanical lifting cylinders, ball screws, belt drives, pneumatic or hydraulic drives, within the respective reservoir 5a, 5b or the side walls 6a, 5b thereof in a purely translational or linear movement in a direction perpendicular in relation to the working plane, with the required precision to generate the desired layer thickness.

The first support plate 7a serves as a construction platform and is lowered during performance of the PBLM method, as described in the introduction, together with the substrate plate, not illustrated, starting from a starting position, wherein the component to be manufactured and the powder bed are built up on the first support plate 7a or the substrate plate attached thereto and are supported thereby within the reservoir 5a. In order to be able to screw the substrate plate to the support plate 7a, the support plate 7a has corresponding bores. The second reservoir 5b is part of the bottom-up powder conveying mechanism and in this case is also used as a storage reservoir for powder, wherein the second support plate 7b is raised during performance of the PBLM method, as described in the introduction, in the direction of the working plane in order to convey powder to the working plane, said powder being stored below the working plane in the second reservoir 5b. By inversely lowering the second support plate 7b, the volume of the second reservoir 5b is increased in order to be able to receive and store a corresponding quantity of new powder. In this case, the quantity of powder which can be received is limited by the volume of the second reservoir 5b when the support plate 7b is lowered to the maximum extent according to the maximum lifting height. FIG. 1 illustrates the two support plates 7a, 7b in each case in a raised position in the region of the working plane.

In order to load or fill the PBLM system 1 with material in powder form, such a bottom-up powder conveying mechanism or its reservoir can be filled through its upper opening and the associated aperture in the working plane. The process chamber 4 is to be opened for this purpose.

By virtue of the fact that the reservoirs 5a, 5b and the collecting reservoir 14 are connected to the process chamber 4 via the respective aperture in the chamber floor 4b, when the PBLM method is being performed the protective gas atmosphere is also to be maintained at this location and the respective connection is correspondingly gas-tight. The reservoirs 5a, 5b and the collecting reservoir 14 themselves are also gas-tight with respect to their surrounding area.

FIG. 2 shows a view of an inner side of the cover 4a of the process chamber 4 of the PBLM system 1. The powder application unit 8 is attached to the chamber ceiling 4i on the illustrated inner side of the cover 4a. Moreover, one of the side walls 4c is connected at least partially to the chamber ceiling 4i in order to form the cover 4a and to be movable together between the open position and the closed position. As a result, the corresponding side wall 4c is connected to the chamber floor 4b and the remaining adjoining side walls 4c only in the closed position and is spaced apart therefrom in all other positions. Therefore, particularly in the open position the chamber floor 4b is freely accessible in the corresponding region at the height of the working plane. This permits particularly easy cleaning of the process chamber 4.

In the present exemplified embodiment, the entire front wall 4f is attached to the chamber ceiling 4i for this purpose.

In addition, each end wall 4g is split in two, of which each part is likewise attached as a part of the cover 4a to the chamber ceiling 4i.

The parts of the end walls 4g which are complementary thereto and are attached to the chamber floor 4b (see FIG. 1) flatten starting from the rear wall 4e. Both parts form, in the closed position, a complete rectangular end wall 4g (see also FIG. 5). In other words, the cover 4a corresponds approximately to the process chamber 4 which is bisected in the region of its diagonal plane.

Basically, it is also feasible for the end walls 4g to be split differently and accordingly for portions thereof to be attached to the chamber ceiling 4i or to the chamber floor 4b. The end walls 4g can also be attached completely to the chamber floor 4b and only one side wall 4c, e.g. only the front wall 4f, can be attached completely or at least in sections to the cover 4a such that, when the cover 4a is in a position deviating from the closed position, corresponding access to the chamber 4b or the working plane without edges and thus without barriers is possible.

Moreover, at least one viewing window 4h is arranged in one of the side walls 4c, e.g. as shown in FIG. 2 two viewing windows 4h in the front wall 4f, through which in the closed position the process chamber 4 can be viewed.

In order to be able to reliably extract smoke gas which is produced during the PBLM method, contains in particular soot particles of the melted powder and attenuates the laser radiation coupled into the process chamber 4, a smoke gas extraction system split in two is provided. The smoke gas extraction system is part of a filter system for filtering a volume stream which contains the smoke gas of the PBLM system 1 and is guided through the PBLM system 1. Within the process chamber 4, the volume stream is divided into a first volume stream guided along the coupling-in glasses 4d and into a second volume stream guided along the working plane. Both volume streams are, where possible, homogeneous and laminar and mutually parallel at least in the region of the coupling-in glasses 4d or the chamber floor 4b. For this purpose, as seen in the direction of travel F, a strip 9d (see FIG. 1) of the smoke gas extraction system is provided in each case at opposite ends of the process chamber 4 on the chamber floor 4b.

A first part of the smoke gas extraction system which is attached to the cover 4a for the first volume stream comprises for each coupling-in glass 4d a flat and funnel-shaped channel 9 which, starting from a first opening 9a arranged on the corresponding coupling-in glass 4d, extends along the cover 4a in the direction of the end wall 4g. In this case, the opening 9a extends approximately over the width of the coupling-in glass 4d. The channel 9 tapers in the direction of the end wall 4g, then extends in a tubular manner, in particular at a right angle, away from the cover 4a and terminates with a second opening 9b. All of the components of the smoke gas extraction system attached to the cover 4a are arranged outside the movement region of the powder application unit 8, wherein the funnel-shaped region of the channel 9 is arranged between the cover 4a and the components of the powder application unit 8 which are movable in the direction of travel F. The first volume stream extends between the two openings 9a outside the channel 9 and in parallel with the chamber ceiling 4i through the process chamber 4 in order to discharge smoke gas from the region of the coupling-in glasses 4d from the process chamber 4. The smoke gas extraction system in the region of the coupling-in glasses 4d is important in order to prevent said glasses from becoming contaminated by deposits produced by smoke gas and reducing the power of the coupled-in laser beam or to prevent said glasses from being destroyed as a result of increased absorption of the laser radiation at the contaminated site by reason of strong local heating associated therewith.

A second part of the smoke gas extraction system which is provided for the second volume stream is formed by two facing intersections, of which in each case one is formed in one of the two strips 9d. Between the two intersections, the second volume stream is guided in the region of the chamber floor 4b through the process chamber 4 in order also to discharge smoke gas from the region of the working plane from the process chamber 4.

In order to divide the volume stream guided into the process chamber 4 or to combine the two volume streams to form one common volume stream guided through the filter system, each strip 9d has a third opening 9c which, when the cover 4a is closed, coincides with the second opening 9b in the tubular part of the channel 9 (see FIG. 2a). The volume stream is caused, by the particular strip 9d, to flow into the process chamber 4 and to be separated, said process chamber being arranged more remotely from the component reservoir. The two volume streams are then combined by the strip 9d arranged more closely to the component reservoir and are guided out of the process chamber 4 in order to be filtered. After filtering, the filtered volume stream is guided via the intersection of the other strip 9d back into the process chamber 4 and is divided up accordingly.

The powder application unit 8 comprises not only the slide 8a for the application medium but also a linear drive unit 8b with a motor. The drive unit 8b is attached preferably completely to the chamber ceiling 4i and extends in the form of a rail in the direction of travel F and in this case preferably in parallel with a plane formed by the chamber ceiling 4i and preferably also in parallel with the front wall 4f. When the cover 4a is in the closed position, both the slide 8a and also the application medium extend with their longitudinal extension in parallel with the working plane and substantially transversely, in particular at a right angle, to the direction of travel F. By means of a drive block 8g which is driven by the drive unit 8b, a crossbar 8d, on which the slide 8a with the application medium is mounted, can be moved translationally in a reciprocating manner in the direction of travel F between opposite ends of the cover 4a which are formed by the two end walls 4g or the parts thereof connected to the chamber ceiling 4i. In this case, the crossbar 8d is connected at one of its two ends to the drive block 8g and is connected at the opposite other end to two guide carriages 8c for the purpose of absorbing transverse forces. The two guide carriages 8c are arranged for this purpose at a fixed spaced interval one behind the other in the direction of travel F and can be moved along a guide rail 8f which serves as a guide and extends in a straight line in the manner of a linear guide. The guide rail 8f is attached to the chamber ceiling 4i in a similar manner to the drive unit 8b and extends spaced apart from the drive unit 8b and in parallel therewith and preferably in parallel with the plane formed by the chamber ceiling 4i. As a result, the direction of travel F in each position of the cover 4a or the powder application unit 8 is in parallel with the plane formed by the chamber ceiling 4i and in parallel with the working plane. At least when the cover 4a is in the closed position, the plane formed by the chamber ceiling 4i also lies in parallel with the horizontal working plane.

By virtue of this structure or the attachment of the powder application unit 8 above the working plane and in particular to the chamber ceiling 4i or the cover 4a, the powder application unit 8 is suspended in the working position, i.e. in the closed position of the cover 4a, from the chamber ceiling 4i or from the cover 4a to the working plane.

Arranged between the linear drive unit 8b and the guide rail 8f are the two coupling-in glasses 4d, as a result of which, when the cover 4a is closed, in each case at least one laser beam can be coupled-in and guided to the corresponding reservoir 5a or 5b. It is also possible to view the process chamber 4 and the working plane through the coupling-in glasses 4d. However, it is likewise feasible for only one coupling-in glass 4d, which is dimensioned correspondingly larger, to be provided in order with the laser beams to reach at least the support plates 7a, 7b or substrate plates of the two reservoirs 5a, 5b if the PBLM system 1 is a multiscanner system.

FIG. 2a illustrates a view of the powder application unit 8 in its previously described working position when the process chamber 4 is completely closed. It is possible to see the drive block 8b, via which the crossbar 8d is drivingly connected to the drive unit 8b. The crossbar 8d and the slide 8a supported thereby are suspended in the direction of the chamber floor 4b and are arranged accordingly between the guide rail 8f or the drive unit 8b and the chamber floor 4b. Therefore, no component of the powder application unit 8 is attached to the chamber floor 4b or the working plane, but instead is located as far as possible therefrom, so as to minimise contamination by powder in the region of the movable components or guide components, in particular the connection of the guide carriages 8c to the guide rail 8c and of the drive block 8g to the drive unit 8b, which connection is concealed in FIG. 2 and is therefore not illustrated. In order to design a correspondingly suspended powder application unit 8, the powder application unit 8 can also be attached partially or completely to at least one of the side walls 4c. The corresponding side wall 4c can be attached to the chamber floor 4b or can be moved as part of the cover 4a or in the manner of a drawer in relation to the chamber floor 4b between a closed position and an open position in order to open or close the process chamber 4. Owing to the aforementioned contamination problems, the powder application unit 8 is attached as closely as possible to the chamber ceiling 4i. It is likewise feasible for the powder application unit 8 to be attached partially or completely to the chamber ceiling 4i but this is not formed as part of a cover 4a and is also not attached to a side wall 4c, which is movable in the manner of a drawer, and cannot be moved therewith. In this case, the process chamber 4 can be opened and closed e.g. via a side door on one of the side walls 4c.

When the cover 4a is in the closed position to allow ongoing operation of the PBLM system 1, the powder application unit 8 is in the working position (see FIG. 2a), wherein at least the application medium extends in parallel with the substrate plate and the working plane, so that on the construction platform of the PBLM system 1 in the direction of travel F powder can be applied uniformly with a surface of the respective powder layer which is as flat as possible and is as parallel as possible with the substrate plate and the working plane. In order to be able to orient the application medium in parallel with the surface of the substrate plate or the working plane or even to be able to easily change same, the slide 8a has a clamping holder, to which or by means of which the corresponding application medium can be releasably attached and correspondingly oriented. For this purpose, each coupling-in glass 4d is releasably attached and removable so that after its removal from the chamber ceiling 4i the powder application unit in the process chamber 4 is accessible for corresponding orientation even when the cover 4a is in the closed position. Preferably, the drive unit 8*b* and the guide rail 8*f* also extend in parallel with the working plane. Alternatively the slide 8*a* with the application medium can also be mounted so as to be able to rotate about an axis arranged at a right angle to the working plane and e.g. between the two reservoirs 5*a*, 5*b*, wherein the drive unit 8*b* represents a corresponding rotary drive.

The brush 8*e* which serves as an application medium and is movable via the slide 8*a* or guide carriage 8*c* extends continuously along the longitudinal extension of the slide 8*a* and in the working position between the slide 8*a* and the working plane or the chamber floor 4*b*. Preferably, the brush 8*e* extends in the working position and during performance of the PBLM method to the working plane or to the chamber floor 4*b* and contacts same in order to entrain as completely as possible powder which, as seen in the respective direction of travel F, is located upstream of the slide 8*a* or the brush 8*e*, and at the same time to produce the flattest surface possible of the powder layer at the height of the working plane. An effective length is defined by the associated extension of the brush 8*e* along the longitudinal extension of the slide 8*a*. The application medium can entrain powder and apply it uniformly only in the region of the effective length. The effective length can also be formed by more than one brush 8*e* if these brushes are positioned correspondingly closely next to one another.

When the cover 4*a* is in the closed position, the effective length of the application medium is congruent with or shorter than the corresponding longitudinal extension of the base surface of collecting reservoir 14, so that the excess powder can be pushed as completely as possible into the powder overflow, without collecting on the working plane on the edges of the respective powder overflow. However, in order to be able to produce a uniform powder layer, the slide 8*a*, with its effective length formed by the application medium, completely spans at least in the working position the first reservoir 5*a* for the component, preferably also the second reservoir 5*b* of the bottom-up powder conveying mechanism. As a result, the application medium serves not only to push powder onto the first support plate 7*a* or the substrate plate but also serves as means for smoothing the powder layer produced at the desired layer thickness thereby. In the case of the first powder layer, the desired layer thickness of the powder layer corresponds to the spaced interval between the working plane and the substrate plate and in the case of each further powder layer corresponds to the spaced interval between the working plane and the surface of the preceding powder layer.

Moreover, the application medium extends alone or together with the slide 8*a* starting from the working plane over an effective height which permits entrainment of a powder quantity which is sufficient for the application of at least one uniform powder layer.

Instead of using a brush 8*e*, it is also possible to use another application medium, such as e.g. a rubber lip, silicone lip, blade or roller.

FIG. 3 shows a side view of the PBLM system 1 shown in FIG. 1 with the process chamber 4 completely open and with the cover 4*a* positioned accordingly opposite the chamber floor 4*b* and removed in particular from the remaining side walls 4*c* attached thereto. In this case, the cover 4*a* is illustrated in the open position which corresponds to a non-operative position of the powder application unit 8 attached to the cover 4*a* as described above.

In the open position, the cover 4*a* is arranged approximately at the same height next to the parts of the process chamber 4 attached to the table 3 and furthermore is rotated such that the cover 4*a* points with its inner side obliquely upwards and away from the PBLM system 1 and in particular away from the chamber floor 4*b*. As a result, the inner side of the cover 4*a* and the powder application unit 8 are easily accessible for a person standing next to the table 3 in order to change e.g. the powder application medium or to be able to easily clean the cover 4*a* and the powder application unit 8 for a change of material. Therefore, in comparison with the closed position or the working position, the cover 4*a* or the powder application unit 8 is positioned further spaced apart from the chamber floor 4*b* and preferably in this case is arranged offset both in a translational manner vertically and horizontally and also in a rotational manner. In the non-operative position, the powder application unit 8 is also arranged outside the process chamber 4 or the space enclosed by the closed process chamber 4.

In order to be able to move the cover 4*a* or the powder application unit 8 between the open position or the non-operative position and the closed position or working position shown in FIG. 5, the cover 4*a* and thus also the powder application unit 8 is mounted accordingly so as to be movable, in particular in an articulated and thus pivotable manner.

For this purpose, the PBLM system 1 comprises a pivot mechanism, by means of which the cover 4*a* is mounted. The movements described hereinafter only in relation to the cover 4*a* and which the cover 4*a* performs by means of the pivot mechanism between the open position and the closed position apply accordingly also to the powder application unit 8 and its movements between the non-operative position and the working position because said powder application unit performs all of the movements of the cover 4*a* together with the cover 4*a* by reason of its attachment to the cover 4*a*. Moreover, for reasons relating to symmetry only one of two identically constructed halves of the pivot mechanism is described, the cover 4*a* and thus also the powder application unit 8 being mounted so as to be able to rotate between the two pivot arms 10 of said pivot mechanism.

Each pivot arm 10 is bar-shaped and is attached in the manner of a lever at one end to a support structure of the PBLM system 1, in particular on the table 3 and next to the chamber floor 4*b* and in this case is mounted so as to be able to rotate or pivot about a first axis of rotation. Alternatively, the pivot arm 10 can also be attached to one of the side walls 4*c*. The first axis of rotation is formed by a first rotary bearing D1 attached in a positionally fixed manner to the PBLM system 1 and extends horizontally to or in parallel with the chamber floor 4*b* and in parallel with or transversely to the direction of travel F and thus in parallel with one of the side walls 4*c*, e.g. the rear wall 4*e* or one of the end walls 4*g*. The pivot arm 10 can be pivoted about the first axis of rotation by means of a bar-shaped handle 13 which is connected to the pivot arm 10 for conjoint rotation therewith. However, the pivot mechanism can basically also be operated in an automated manner and for this purpose can be driven e.g. by means of a motor. The pivot arm 10 is connected via a second rotary bearing D2 to the cover 4*a*, in particular to the part of the end wall 4*g* attached thereto. As a result, the cover 4*a* is mounted on the pivot arm 10 so as to be rotatable about a second axis of rotation formed by the second rotary bearing D2. The first and second axes of rotation extend in each position of the cover 4*a* in parallel with each other, wherein the second axis of rotation is moved with the pivot arm 10 in the direction of the first rotational movement about the first axis of rotation.

As a consequence of a rotational movement of the pivot arm 10 about the first axis of rotation, the cover 4*a* performs, proceeding from the open position in the direction of the closed position, a first rotational movement about the first axis of rotation in the form of a pivot movement. As a result, the cover 4a is moved towards the chamber floor 4b. When the cover 4a is mounted on the pivot arm 10 for conjoint rotation therewith, the pivot radius of each point of the cover 4a and the powder application unit 8 would be constant during the first rotational movement. This is basically also possible but is not the case in the present exemplified embodiment because the cover 4a simultaneously performs a second rotational movement about the second axis of rotation of the second rotary bearing D2. As a result, the pivot radii of individual points can be changed during the pivoting about the first axis of rotation such that the scanner unit 2 can remain in its operating position despite the fact that, when the cover 4a is mounted in a rotationally fixed manner in the open position or closed position, said scanner unit could lie in the pivot radius of a point and would thus cause a collision. In this case, the direction of rotation of the second rotational movement is opposite to the direction of rotation of the first rotational movement by reason of the fact that a traction drive 11, which is designed e.g. as a belt drive, is incorporated into the pivot mechanism as described below, wherein the two rotational movements are coupled to one another by means of the traction drive 11. In this case, the cover 4a rotates about the second axis of rotation of the second rotary bearing D2 such that it no longer points with its inner side away from the chamber floor 4b but instead points in the direction thereof if the cover 4a is guided through below the scanner unit 2 in the direction of the closed position.

FIG. 4 shows a side view of the PBLM system 1 with an accordingly only partially open process chamber 4, wherein the pivot arm 10 has already been pivoted over the vertical in the direction of the chamber floor 4b and is arranged partially thereabove. The cover 4a, proceeding from the open position, has already been rotated at the same time in the opposite direction of rotation about the second axis of rotation so that the inner side then points downwards in the direction of the table 3 or the chamber floor 4b. Between the positions shown in FIG. 3 and FIG. 4, the cover 4a passes through a position which is upright in relation to the chamber ceiling 4i and in which the chamber ceiling 4i extends vertically to the chamber floor 4b and points correspondingly in a direction in parallel with the chamber floor 4b.

FIG. 5 shows a side view of an PBLM system 1 with the process chamber 4 completely closed. Proceeding from FIG. 4, both rotational movements have been continued for this purpose, wherein the cover 4a is guided under the scanner unit 2 as the oblique position decreases and, with a horizontally oriented chamber ceiling 4i comes to lie in the closed position on the side walls 4c attached to the chamber floor 4b.

With correspondingly reversed movements, the cover 4a can be moved from the closed position to the open position. When the cover 4a is mounted on the pivot arm 10 for conjoint rotation therewith corresponding to the closed position, a correspondingly extensive rotational movement, proceeding herefrom, about the first axis of rotation would basically also lead to an inner side of the cover 4a pointing obliquely upwards, corresponding to the open position. Apart from the associated problem of continuously constant pivot radii, the pivot arm 10 would also have to be pivoted over a larger angle range than when the cover 4a is mounted so as to be rotatable about the second axis of rotation in order to arrange the inner side of the cover 4a pointing obliquely upwards, as previously described.

FIG. 6 shows a view of the traction drive 11 which is designed as a belt drive and by means of which the first rotational movement is coupled to the second rotational movement such that the first rotational movement is converted uniformly into the opposite second rotational movement, preferably with a conversion ratio of 1:2, whereby the second rotational movement has twice the circumference of the first rotational movement. Other conversion ratios are also feasible, in particular those deviating from a conversion ratio of 1:1. For this purpose, a first disk 11b in the form of a belt pulley is arranged on the first rotary bearing D1 and is arranged coaxially with the first axis of rotation but is mounted in a rotationally fixed manner in relation thereto. A second disk 11c in the form of a belt pulley is arranged on the second rotary bearing D2 and is mounted so as to be able to rotate about the second axis of rotation. The second disk 11c is connected to the cover 4a or its end wall 4g for conjoint therewith. A closed belt is guided as a traction means 11a via the two disks 11b and 11c and is tensioned by the spaced interval therebetween. The spaced interval between the two disks 11b and 11c is established by the pivot arm 10, not shown in FIG. 6, which accommodates the two rotary bearings D1 and D2. The traction means 11a designed as a belt is designed preferably as a geared belt and the disks 11b and 11c are formed with corresponding external toothing as toothed disks.

By reason of this design, the pivoting of the pivot arm 10 proceeding from the closed position ensures that the second axis of rotation with the first rotational movement is moved over a circular arc-shaped path about the first axis of rotation by the chamber floor 4b. In this case, the second disk 11c is entrained, whereby corresponding to the conversion ratio it performs a forced rotation about the second axis of rotation and in this case runs off internally on the traction means 11a. The forced rotation is effected, as described above, with the second rotational movement in the opposite direction to the first rotational movement. When the process chamber 4 is being opened, the second disk 11c is directed accordingly on the lower section of the traction means 11a away from the first disk 11b and vice versa during the closing procedure. The cover 4a which is attached to the second disk 11c for conjoint rotation therewith is accordingly rotated therewith. In this case, the angle of wrap, which is formed by the traction means 11a, is constant on the first disk 11b, whereas the direction of the two sections of the traction means 11c running from the first disk 11b changes corresponding to the pivoting movement of the pivot mechanism or the pivot arm 10. As a result, one of the two sections becomes attached to the first disk 11b as a result of the rotation of the pivot arm 10, whereas the other becomes detached to the same extent.

Alternatively, instead of the belt drive it is equally also possible to use another form-locking traction drive 11 or continuously variable drive, e.g. a chain drive which similarly has a first disk and a second disk and a corresponding traction means.

In order to assist the rotational movements of the pivot mechanism which are introduced manually by means of the handle 13, or to effect same in terms of automation, a force device is provided which is provided as a spring element, which is bar-shaped and can be varied in length, preferably in the form of a gas compression spring 12 (see FIG. 6). The spring element is attached to the first rotary bearing D1 in an articulated manner in relation to the first axis of rotation (see FIGS. 3 to 6). Moreover, the spring element is attached to the cover 4a, in particular to the end side 4g, in an articulated manner and in this case can be rotated about a third axis of rotation in parallel with the first two axes of rotation. The spring element extends with its variable longitudinal extension substantially in parallel with the end wall 4g so that the pivot arm 10 is arranged between the spring element and the traction drive 11. The spring element engages adjacent to the second rotary bearing D2. If the spring element is designed as a compression spring as in the exemplified embodiment, the spring element must be articulated to the cover 4a on a side of the second rotary bearing D2 remote from the front wall 4f so that the above-described rotational movement of the cover 4a about the second axis of rotation is assisted when the process chamber 4 is being opened. As long as the spring element is not yet oriented vertically and in parallel with the pivot arm 10 when the process chamber 4 is being closed (see FIG. 3) and accordingly has not yet undergone its maximum longitudinal extension, the corresponding second rotational movement of the cover 4a about the second axis of rotation is facilitated and the continued rotational movement is braked after the vertical orientation is exceeded by reason of the torque direction, which is changed in relation to the second axis of rotation, up to the closed position. Conversely, the second rotational movement is assisted in the same manner during the movement from the closed position to the open position. The spring element can also be designed to like effect as a tension spring and can be articulated accordingly between the second rotary bearing D2 and the front wall 4f. Instead of a spring element, a hydraulic or pneumatic lifting cylinder or electric drives which act correspondingly in a linear manner can also be used as the force device.

Basically, it is also feasible for the powder application unit 8 to be decoupled from the cover 4a and to be movable between the working position and the non-operative position independently of a movement of the cover 4a between the open position and the closed position. For this purpose, a pivot mechanism designed in the manner described above can also be arranged and mounted within the process chamber 4 in order to pivot the powder application unit 8 out of the process chamber 4 e.g. when the process chamber 4 is open. The powder application unit 8 can also be moved between the working position and a non-operative position within the process chamber 4 when the process chamber 4 is closed and is of a sufficient size, and can be rotated as described above in the event of a correspondingly large transmission of a traction drive designed in a similar manner to the traction drive 11.

Furthermore, proceeding from the working position the powder application unit 8 can also be moved with a purely translational movement to a corresponding non-operative position. In this case, at least one component of the powder application unit 8 which is arranged in a positionally fixed manner during ongoing operation of the PBLM system 1 and thus in the working position, e.g. the drive unit 8b and/or the guide rail 8f, is positioned more spaced apart in the non-operative position in relation to the chamber floor 4b in a different manner and in particular vertically with respect to the chamber floor 4b than in the working position during ongoing operation of the PBLM system 1. In this case, the powder application unit 8 or the corresponding component can also be attached to the chamber ceiling 4i or one of the side walls 4c and can be moved together therewith between the closed position and the open position. Then, in a similar manner to the exemplified embodiment the non-operative position corresponds to the open position of the chamber ceiling 4i or the respective side wall 4c and the working position corresponds to the closed position.

In this sense, the powder application unit 8 can also be moved only partially between the working position and a non-operative position, in that e.g. the slide 8a connected to the crossbar 8d can be pivoted or swung out together with respect to the drive unit 8b and/or the guide rail 8f about an axis of rotation and therefore is spaced apart differently, in particular vertically with respect to the chamber floor 4b to a greater extent, in relation to the chamber floor 4b. The powder application unit 8 can be attached additionally to a side wall 4c or the chamber ceiling 4i and can be moved together therewith.

Moreover, the powder application unit 8 can be arranged in its non-operative position at least partially outside, in particular next to and/or above, the process chamber 4. This applies in particular if the corresponding side wall 4c or the chamber ceiling 4i in the open position is positioned offset sufficiently far enough in relation to the chamber floor 4b, but also if the powder application unit 8 can be moved independently of the side walls 4c and the chamber ceiling 4i out of a correspondingly opened process chamber 4.

The invention claimed is:

1. A PBLM system comprising:
   a process chamber which has a chamber floor which forms a working plane of the PBLM system;
   a table; and
   a powder application assembly comprising a rail-shaped linear drive and a guide configured as a guide rail, and having an application medium movable in parallel with the working plane, wherein the powder application assembly is movably attached to the table of the PBLM system such that the powder application assembly can be moved at least partially between a working position and a non-operative position, wherein in the working position during ongoing operation of the PBLM system the powder application assembly is arranged in the process chamber and above the chamber floor and at least one of the rail-shaped linear drive and the guide rail of the powder application assembly is arranged in a positionally fixed manner;
   wherein the at least one of the rail-shaped linear drive and the guide rail of the powder application assembly that is arranged in a positionally fixed manner in the working position during ongoing operation of the PBLM system is positioned further spaced apart from the chamber floor in the non-operative position than in the working position and/or is positionable between the non-operative position and the working position in relation to the chamber floor;
   wherein the powder application assembly is rotatably attached to the table such that at least one of the rail-shaped linear drive and the guide rail of the powder application assembly performs a first rotational movement in relation to a first axis of rotation between the working position and the non-operative position, and wherein the PBLM system has a pivot assembly comprising a pivot arm to which the powder application assembly is attached in order to rotatably attach the powder application assembly to the table.

2. The PBLM system as claimed in claim 1, wherein the powder application assembly in the non-operative position is arranged at least partially outside the process chamber.

3. The PBLM system as claimed in claim 1, wherein the powder application assembly is rotatably attached to the table such that the powder application assembly additionally performs a second rotational movement in relation to a second axis of rotation between the working position and the non-operative position.

4. The PBLM system as claimed in claim 3, wherein the pivot arm is mounted to the table so as to be able to rotate about the first axis of rotation by means of a first rotary bearing.

5. The PBLM system as claimed in claim 4, wherein the powder application assembly is mounted on the pivot arm so as to be able to rotate about the second axis of rotation by a second rotary bearing.

6. The PBLM system as claimed in claim 5, wherein the pivot assembly further comprises a traction drive connected to the powder application assembly such that the first rotational movement is coupled to the second rotational movement such that the first rotational movement and the second rotational movement are mutually opposed.

7. The PBLM system as claimed in claim 6, wherein the traction drive engages between a first disk and a second disk, wherein the first disk is mounted in a rotationally fixed manner in relation to the first axis of rotation and the second disk is mounted so as to be rotatable about the second axis of rotation and is connected to the powder application assembly for conjoint rotation therewith.

8. The PBLM system as claimed in claim 5, wherein the pivot assembly further comprises a force device configured as a gas compression spring, as a hydraulic or pneumatic drive, or as a linearly acting electric drive, and is arranged such that, in the working position and in the non-operative position, the force device acts adjacent the second rotary bearing upon the powder application assembly in order to at least assist the rotational movements of the pivot assembly.

9. The PBLM system as claimed in claim 1, wherein the rail-shaped linear drive and/or guide rail of the powder application assembly is attached to a side wall and/or to a chamber ceiling of the process chamber, wherein the side wall and/or the chamber ceiling can be moved together with the powder application assembly between a closed position corresponding to the working position and an open position corresponding to the non-operative position.

10. The PBLM system as claimed in claim 9, wherein the side wall and/or the chamber ceiling is part of a movable cover of the process chamber which is arranged between the powder application assembly and the pivot assembly.

11. The PBLM system as claimed in claim 6, wherein the traction drive comprises a form-locking traction drive.

12. The PBLM system as claimed in claim 6, wherein the traction drive is in the form of a belt drive or a chain drive.

13. The PBLM system as claimed in claim 3, wherein said second axis of rotation extends in parallel with the first axis of rotation.

14. The PBLM system as claimed in claim 13, wherein the first rotational movement and the second rotational movement are mutually opposed.

* * * * *